Dec. 20, 1927.
T. H. THOMAS
1,653,130
ELECTROPNEUMATIC BRAKE
Filed Jan. 4, 1927
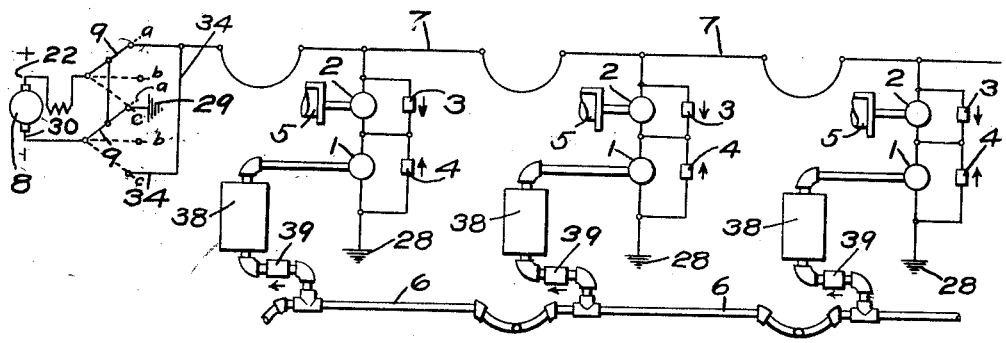
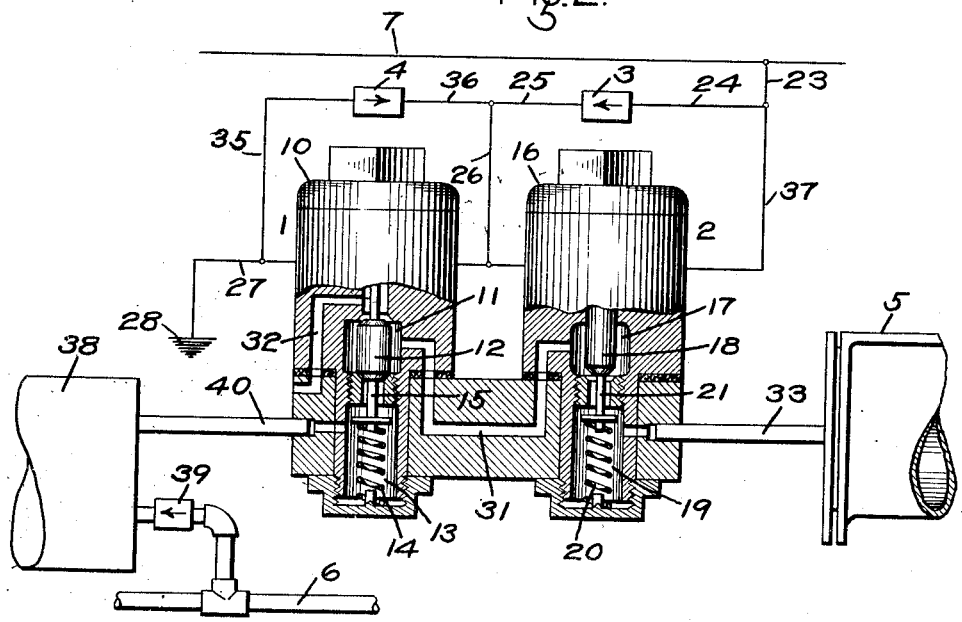
INVENTOR
THOMAS H. THOMAS
BY *Wm. M. Cady*
ATTORNEY Patented Dec. 20, 1927.

1,653,130

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed January 4, 1927. Serial No. 158,934.

This invention relates to electro-pneumatic brakes and has for its principal object to provide an electro-pneumatic brake system in which the application and release of the brakes are controlled through a single train wire.

In the accompanying drawing; Fig. 1 is a diagrammatic view of an electro-pneumatic brake system embodying my invention, as applied to an electrically propelled vehicle and three cars; and Fig. 2 a view, partly in section, of the brake equipment employed on each car.

As shown in Fig. 1 of the drawing, each car is provided with a release magnet valve device 1, an application magnet valve device 2, two rectifiers or devices adapted to permit the flow of current only in one direction, 3 and 4, a brake cylinder 5, an auxiliary reservoir 38, a fluid pressure supply pipe 6 connected to the reservoir 38 through a check valve 39 and an electric train wire 7. On the locomotive is provided a generator 8 having its leads connected to a double throw switch device 9.

The release magnet valve device 1 comprises a magnet 10 and a casing having a chamber 11 containing a double beat valve 12 adapted to be operated by said magnet, and a chamber 13 containing a coil spring 14 adapted to engage a collared stem 15 secured to the valve 12.

The application magnet valve device 2 comprises a magnet 16 and a casing having a chamber 17 containing a valve 18, adapted to be operated by said magnet, and a chamber 19 containing a coil spring 20 adapted to engage a collared stem 21 secured to the valve 18.

The fluid pressure supply pipe 6 and the train wire 7 on each car are adapted to be connected between adjoining cars, so as to form a continuous pipe line and electric train wire, throughout the train.

The rectifiers 3 and 4 are disposed in shunt circuits around the magnets 16 and 10 respectively, and are adapted to permit the flow of electric current only in one direction, as indicated by the arrow on each rectifier. The resistance of each shunt circuit, including the rectifier, is so small in comparison to the resistance of the magnet around which said shunt circuit is made, that substantially all the current flows through the rectifier, and the small amount of current that flows through the magnet is insufficient to operate said magnet. For example, the current flowing from wire 7 to wire 23, flows through the rectifier 3 and is prevented from flowing through the shunt circuit around magnet 10 by the rectifier 4. Said current therefore flows through wire 26 and magnet 10. The small amount of current that flows through the magnet 16, in this instance, is insufficient to operate said magnet. In the same manner, when current is flowing in the reverse direction, the magnet 16 is energized while the magnet 10 remains substantially deenergized.

In operation, assuming the fluid pressure supply pipe 6 charged with fluid under pressure, fluid under pressure is supplied from said pipe on each car through the check valve 39 to the auxiliary reservoir 38, charging said reservoir.

With the double throw switch 9 in the position $a$—$a$, as shown in Fig. 1, the electric current supplied by the generator 8, flows from the positive pole 22 of said generator to the train wire 7, thence through the branch wires 23 and 24, the rectifier 3 and wires 25 and 26 to the magnet 10, energizing said magnet, and thence through the wire 27 to the ground 28, through which the circuit is completed to the ground 29 at the locomotive, and thence to the negative pole 30 of the generator 8.

The magnet 10 being energized holds the double beat valve 12 seated at its lower seat against the pressure of the coil spring 14, in which position the valve chamber 11, connected to passage 31, is vented by way of passage 32, to the atmosphere.

When the current in the train wire 7 flows in the direction described above, insufficient current flows through magnet 16 to cause it to operate the valve 18 so that said valve is held unseated by the pressure of the spring 20, so that spring chamber 19 is connected to chamber 17 and thence to passage 31. The brake cylinder 5 being connected to chamber 19 through pipe 33, and passage 31 being vented to the atmosphere, when the magnet 10 is energized, the brake cylinder is connected to the atmosphere, thus providing for the release of the train brakes.

To effect an application of the brakes, the double throw switch 9 is moved to a position b—b, as shown in dotted lines, in which position the circuit from the generator 8 is broken, thereby deenergizing the magnet 10, so that the pressure of spring 14 is permitted to shift the double beat valve 12 to its upper seat and thus close communication from chamber 11 to the atmospheric passage 32.

With the valve 12 seated in its upper position, fluid under pressure from the auxiliary reservoir 38 flows through pipe 40 into spring chamber 13, thence to valve chamber 11 and through passage 31 to valve chamber 17, and since the application magnet 16 is also deenergized so that the valve 18 is in open position, fluid from the auxiliary reservoir flows from chamber 17 into spring chamber 19 and through pipe 33 to the brake cylinder 5, thus causing an application of the brakes. So long as magnet 16 remains deenergized, fluid from the auxiliary reservoir will continue to flow to the brake cylinder, as described above, until the brake cylinder pressure equals that in the auxiliary reservoir.

If, however, it is desired to limit the brake cylinder pressure to some degree less than the equalization pressure, or to graduate the application of the brakes, when the desired pressure is attained in the brake cylinder, the operator moves the double throw switch from application position b—b to lap position c—c, shown in dotted lines, in which the positive pole 22 of the generator 8 is connected to the ground 29, and the negative pole 30 is connected to the train wire 7 by way of wire 34. The generator current then flows from the positive pole 22 of the generator, through the ground 29 to the ground 28 on the car, thence through wires 27 and 35, rectifier 4, wires 36 and 26, magnet 16 and through wires 37 and 23 to the train wire 7 and through wire 34 to the negative pole 30 of the generator. The magnet 16, being thus energized, operates to close the valve 18 so as to prevent further flow from the auxiliary reservoir to the brake cylinder 5.

When the valve 18 is closed by energization of the magnet 16, the double beat valve 12 is seated in its upper position, since the magnet 10 is deenergized. However, the position of the double beat valve 12 is immaterial at this particular time.

By alternately moving the double throw switch 9 to the positions b—b and c—c, respectively, so as to alternately energize and deenergize the magnet 16, the brake cylinder pressure may be increased in steps up to the degree at which the auxiliary reservoir equalizes into the brake cylinder.

To release the brakes, the double throw switch 9 is moved to the release position a—a, in which the magnet 10 is energized, and shifts the double beat valve 12 to its lower seat, and the magnet 16 is deenergized so that the valve 18 is unseated. Thus the brake cylinder 5 is connected to the atmosphere and release of fluid in the brake cylinder is effected.

If it is desired to graduate the release of the brakes, the double throw switch 9 is moved from release position a—a to lap position c—c, in which the magnet 16 is energized, and operates to seat the valve 18 so as to prevent further flow of fluid from the brake cylinder to the atmosphere. By alternately moving the double throw switch 9 from position a—a to position c—c, the brake cylinder pressure may be reduced in steps, as desired.

In graduating the release of the brakes, the double beat valve 12 is seated in its upper position by the deenergization of magnet 10 when the valve 18 is seated, but this movement of the double beat valve 12 has no effect upon the brake operation at this time.

It will be noted that to apply the brakes the double throw switch 9 is placed in position b—b, in which no current is supplied through the train wire, consequently, both the application magnet 16 and the release magnet 10 are deenergized. This is very desirable, since in case the train wire 7 becomes broken, or if the current should fail from any cause, an application of the brakes will be automatically effected and the train brought to a stop. The brakes cannot then be released and the train started until the circuit has been repaired or the current supply restored.

The check valve 39 is placed in the pipe connecting the fluid pressure supply pipe 6 to the auxiliary reservoir 38, so that in case of the rupture of said pipe, as would occur in case of a train breaking in two, a supply of fluid under pressure is retained on each car to apply the brakes.

Having now described my invention, what I claim as new and desire to secure by Letters Patent, is—

1. The combination with two electrically controlled devices for controlling the application and release of the brakes and a single train wire through which current is supplied to both devices, of means for preventing the effective energization of one device when the other device is energized by flow of current through said wire.

2. The combination with two electrically controlled devices for controlling the application and release of the brakes and a single train wire through which current is supplied to both devices, of means for preventing the operative energization of one device when the other device is energized by flow of current through said wire.

3. The combination with two electrically controlled devices for controlling the application and release of the brakes and a single train wire through which current is supplied to both devices, of means for preventing the effective energization of one device by current flowing through said wire in one direction while the other device is effectively energized by said flow of current.

4. The combination with an electrically controlled device for controlling the brakes and having a shunt circuit through which current flows in one direction, of means in said circuit for preventing the flow of current through said circuit in the opposite direction.

5. The combination with two electrically controlled devices arranged in series and supplied with current from a single train wire and each device having a shunt circuit, of means in one shunt circuit for preventing the flow of current in one direction and means in the other shunt circuit for preventing the flow of current in the opposite direction.

6. In an electro-pneumatic brake, the combination with a brake cylinder, of electrically controlled valve means for controlling the supply and release of fluid under pressure to and from the brake cylinder and electrically controlled valve means for controlling communication through which the first mentioned valve means supplies fluid under pressure to the brake cylinder.

7. In an electro-pneumatic brake, the combination with a brake cylinder, of electrically controlled valve means for controlling the supply and release of fluid under pressure to and from the brake cylinder, electrically controlled valve means for controlling communication through which the first mentioned valve means supplies fluid under pressure to the brake cylinder, and a single train wire through which current is supplied to operate both electrically controlled valve means.

8. In an electro-pneumatic brake, the combination with a brake cylinder, of electrically controlled valve means for controlling the supply and release of fluid under pressure to and from the brake cylinder, electrically controlled valve means for controlling communication through which the first mentioned valve means supplies fluid under pressure to the brake cylinder, a single train wire through which current is supplied to operate both electrically controlled valve means, and means for effecting the energization of only one of said electrically controlled valve means when current is flowing through said train wire in one direction.

9. In an electro-pneumatic brake, the combination with a brake cylinder, of electrically controlled valve means for controlling the supply and release of fluid under pressure to and from the brake cylinder, electrically controlled valve means for controlling communication through which the first mentioned valve means supplies fluid under pressure to the brake cylinder, a single train wire through which current is supplied to operate both electrically controlled valve means, and means for effecting the energization of only one of said electrically controlled valve means when current is flowing through said train wire in one direction and for effecting the energization of the other electrically controlled valve means when current is flowing through said train wire in the reverse direction.

10. In an electro-pneumatic brake, the combination with a brake cylinder, of an electro-magnet, a double beat valve operated upon deenergization of said magnet for supplying fluid under pressure to the brake cylinder and upon energization of said magnet for connecting said brake cylinder to the exhaust, a second electro-magnet, and a valve operated upon energization of said magnet for closing communication through which fluid under pressure is supplied to the brake cylinder by operation of said double beat valve.

11. In an electro-pneumatic brake, the combination with a brake cylinder, of an electro-magnet, a double beat valve operated upon deenergization of said magnet for supplying fluid under pressure to the brake cylinder and upon energization of said magnet for connecting said brake cylinder to the exhaust, a second electro-magnet, a valve operated upon energization of said second magnet for closing communication through which fluid under pressure is supplied to the brake cylinder by operation of said double beat valve, and a single train wire for controlling the current to said magnets.

12. In an electro-pneumatic brake, the combination with a brake cylinder, of an electro-magnet, a double beat valve operated upon deenergization of said magnet for supplying fluid under pressure to the brake cylinder and upon energization of said magnet for connecting said brake cylinder to the exhaust, a second electro-magnet, a valve operated upon energization of said second magnet for closing communication through which fluid under pressure is supplied to the brake cylinder by operation of said double beat valve, a single train wire connected to said magnets, and means for energizing one magnet only when current flows through said train wire in one direction and the other magnet only when current flows through said train wire in the reverse direction.

13. A one wire electrically controlled brake having means for effecting the release of the brakes when current is flowing through said wire in one direction, for holding the brakes applied when current is flowing through said wire in the reverse direction, and for applying the brakes when no current is flowing through said wire.

In testimony whereof I have hereunto set my hand.

THOMAS H. THOMAS.